United States Patent
Bhardwaj et al.

(10) Patent No.: US 9,608,242 B2
(45) Date of Patent: Mar. 28, 2017

(54) BATTERY PACK WITH CELLS OF DIFFERENT CAPACITIES ELECTRICALLY COUPLED IN PARALLEL

(71) Applicant: Apple Inc., Cupertino, CA (US)

(72) Inventors: Ramesh C. Bhardwaj, Fremont, CA (US); Taisup Hwang, Santa Clara, CA (US); Richard M. Mank, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/692,689

(22) Filed: Apr. 21, 2015

(65) Prior Publication Data

US 2015/0303416 A1    Oct. 22, 2015

Related U.S. Application Data

(63) Continuation of application No. 12/835,617, filed on Jul. 13, 2010, now Pat. No. 9,040,187.

(51) Int. Cl.
*H01M 2/02* (2006.01)
*H01M 2/10* (2006.01)
(Continued)

(52) U.S. Cl.
CPC ....... *H01M 2/1022* (2013.01); *H01M 2/1027* (2013.01); *H01M 2/204* (2013.01);
(Continued)

(58) Field of Classification Search
CPC .... H01M 2/204; H01M 2/1027; H01M 2/021; H01M 10/052; H01M 10/0565; H01M 10/0587; H01M 2220/30
See application file for complete search history.

(56) References Cited

U.S. PATENT DOCUMENTS 2,333,028 A    10/1943  Merrill
4,607,207 A *   8/1986  Bruneau .................... 429/99
(Continued)

FOREIGN PATENT DOCUMENTS

CN       1283312 A       2/2001
DE   202007003807 U1     7/2007
(Continued)

OTHER PUBLICATIONS

"The Evolution of Oilfield Batteries," Hensley et al., Oilfield Review, Autumn 1998, p. 42-57, retrieved online on 07/15/20414 from: https://www.slb.com/~/media/Files/resources/oilfield_review/ors98/aut98/evolution.pdf.
(Continued)

*Primary Examiner* — Kenneth Douyette
(74) *Attorney, Agent, or Firm* — Polsinelli PC

(57) ABSTRACT

The disclosed embodiments provide a battery pack for use with a portable electronic device. The battery pack includes a first set of cells with different capacities electrically coupled in a parallel configuration. Cells within the first set of cells may also have different thicknesses and/or dimensions. The first set of cells is arranged within the battery pack to facilitate efficient use of space within a portable electronic device. For example, the first set of cells may be arranged to accommodate components in the portable electronic device.

23 Claims, 5 Drawing Sheets

(51) Int. Cl.
*H01M 10/04* (2006.01)
*H01M 2/20* (2006.01)
*H01M 10/052* (2010.01)
H01M 10/0565 (2010.01)
H01M 10/0587 (2010.01)

(52) U.S. Cl.
CPC ..... *H01M 10/0431* (2013.01); *H01M 10/052* (2013.01); *H01M 2/021* (2013.01); *H01M 10/0565* (2013.01); *H01M 10/0587* (2013.01); *H01M 2220/30* (2013.01); *Y02E 60/122* (2013.01); *Y10T 29/49108* (2015.01)

(56) References Cited

U.S. PATENT DOCUMENTS

| | | | |
|---|---|---|---|
| 5,015,546 A * | 5/1991 | Dulaney et al. | 429/99 |
| 6,002,583 A * | 12/1999 | Shoji | G06F 1/1616 |
| | | | 361/679.55 |
| 6,851,828 B1 * | 2/2005 | Hansen | 362/203 |
| 7,479,344 B1 | 1/2009 | McDermott | |
| 2002/0071987 A1 | 6/2002 | Kezuka | |
| 2003/0071523 A1 | 4/2003 | Silverman | |
| 2003/0094923 A1 | 5/2003 | Emori | |
| 2006/0082959 A1 * | 4/2006 | DeLuga | G06F 1/1632 |
| | | | 361/679.41 |
| 2006/0154145 A1 | 7/2006 | Lee | |
| 2007/0002559 A1 * | 1/2007 | Uke | 362/157 |
| 2008/0008933 A1 | 1/2008 | Lampe-Onnerud | |
| 2008/0090139 A1 | 4/2008 | Hurst | |
| 2009/0010804 A1 | 1/2009 | Withrow | |
| 2009/0042096 A1 | 2/2009 | McDermott | |
| 2009/0087729 A1 | 4/2009 | Johnson | |
| 2010/0136396 A1 * | 6/2010 | Hermann et al. | 429/99 |

FOREIGN PATENT DOCUMENTS

| | | |
|---|---|---|
| EP | 1315227 A2 | 5/2003 |
| JP | H11144764 A | 5/1999 |
| JP | 2004087146 A | 3/2004 |
| JP | 3611765 B2 | 1/2005 |
| JP | 200578837 A | 3/2005 |
| JP | 2005078837 A | 3/2005 |
| JP | 2005116237 A | 4/2005 |
| JP | 2006093118 A | 4/2006 |
| TW | 485649 | 5/2002 |
| TW | I257728 | 5/2002 |
| TW | I277231 | 3/2007 |
| WO | 2010013839 A1 | 2/2010 |
| WO | 2012009423 A1 | 1/2012 |

OTHER PUBLICATIONS

Machine Translation of: DE 202007003807 U, Wessel-Werk, Jul. 12, 2007.

Machine Translation of: JP 2005/116237 A, Matsumara, Apr. 28, 2005.

* cited by examiner

BATTERY PACK WITH CELLS OF DIFFERENT CAPACITIES ELECTRICALLY COUPLED IN PARALLEL

RELATED APPLICATION

The instant application is a continuation of, and hereby claims priority to, U.S. patent application Ser. No. 12/835,617, now U.S. Pat. No. 9,040,187, which is titled "Battery Pack With Cells Of Different Capacities Electrically Coupled in Parallel," by the same inventors, which was filed on 13 Jul. 2010, and which is incorporated by reference.

BACKGROUND

Field

The present embodiments relate to batteries for portable electronic devices. More specifically, the present embodiments relate to battery packs with cells of different capacities, thicknesses, and/or dimensions.

Related Art

Rechargeable batteries are presently used to provide power to a wide variety of portable electronic devices, including laptop computers, mobile phones, PDAs, digital music players and cordless power tools. The most commonly used type of rechargeable battery is a lithium battery, which can include a lithium-ion or a lithium-polymer battery.

Lithium-polymer batteries often include cells that are packaged in flexible pouches. Such pouches are typically lightweight and inexpensive to manufacture. Moreover, pouches may be tailored to various cell dimensions, allowing lithium-polymer batteries to be used in space-constrained portable electronic devices such as mobile phones, laptop computers, and/or digital cameras. For example, a lithium-polymer battery cell may achieve a packaging efficiency of 90-95% by enclosing a jelly roll and electrolyte in a foil pouch. Multiple pouches may then be placed side-by-side within a portable electronic device and electrically coupled in series and/or in parallel to form a battery for the portable electronic device.

However, efficient use of space may be limited by the use and arrangement of cells in existing battery pack architectures. In particular, battery packs typically contain cells of the same capacity, size, and dimensions. The physical arrangement of the cells may additionally mirror the electrical configuration of the cells. For example, a six-cell battery pack may include six lithium-polymer cells of the same size and capacity configured in a two in series, three in parallel (2s3p) configuration. Within the battery pack, two rows of three cells placed side-by-side may be stacked on top of each other; each row may be electrically coupled in a parallel configuration and the two rows electrically coupled in a series configuration. Consequently, the battery pack may require space in a portable electronic device that is at least the length of each cell, twice the thickness of each cell, and three times the width of each cell. Furthermore, the battery pack may be unable to utilize free space in the portable electronic device that is outside of a rectangular space reserved for the battery pack.

Hence, the use of portable electronic devices may be facilitated by improvements related to the packaging efficiency, capacity, form factor, cost, design, and/or manufacturing of battery packs containing lithium-polymer battery cells.

SUMMARY

The disclosed embodiments provide a battery pack for use with a portable electronic device. The battery pack includes a first set of cells with different capacities electrically coupled in a parallel configuration. Cells within the first set of cells may also have different thicknesses and/or dimensions. The first set of cells is arranged within the battery pack to facilitate efficient use of space within a portable electronic device. For example, the first set of cells may be arranged to accommodate components in the portable electronic device.

In some embodiments, the battery pack also includes a second set of cells with different capacities electrically coupled in a parallel configuration. The first set of cells and the second set of cells may be electrically coupled in a series configuration if the first set of cells and the second set of cells have substantially the same capacity.

In some embodiments, the first set of cells is stacked, placed side-by-side, or placed top-to-bottom within the battery pack.

In some embodiments, one or more of the first set of cells correspond to a lithium-polymer cell.

In some embodiments, one or more of the first set of cells include:
 (i) a jelly roll containing layers which are wound together, including a cathode with an active coating, a separator, and an anode with an active coating; and
 (ii) a pouch enclosing the jelly roll.

BRIEF DESCRIPTION OF THE FIGURES

In the figures, like reference numerals refer to the same figure elements.

DETAILED DESCRIPTION

Figure 1:
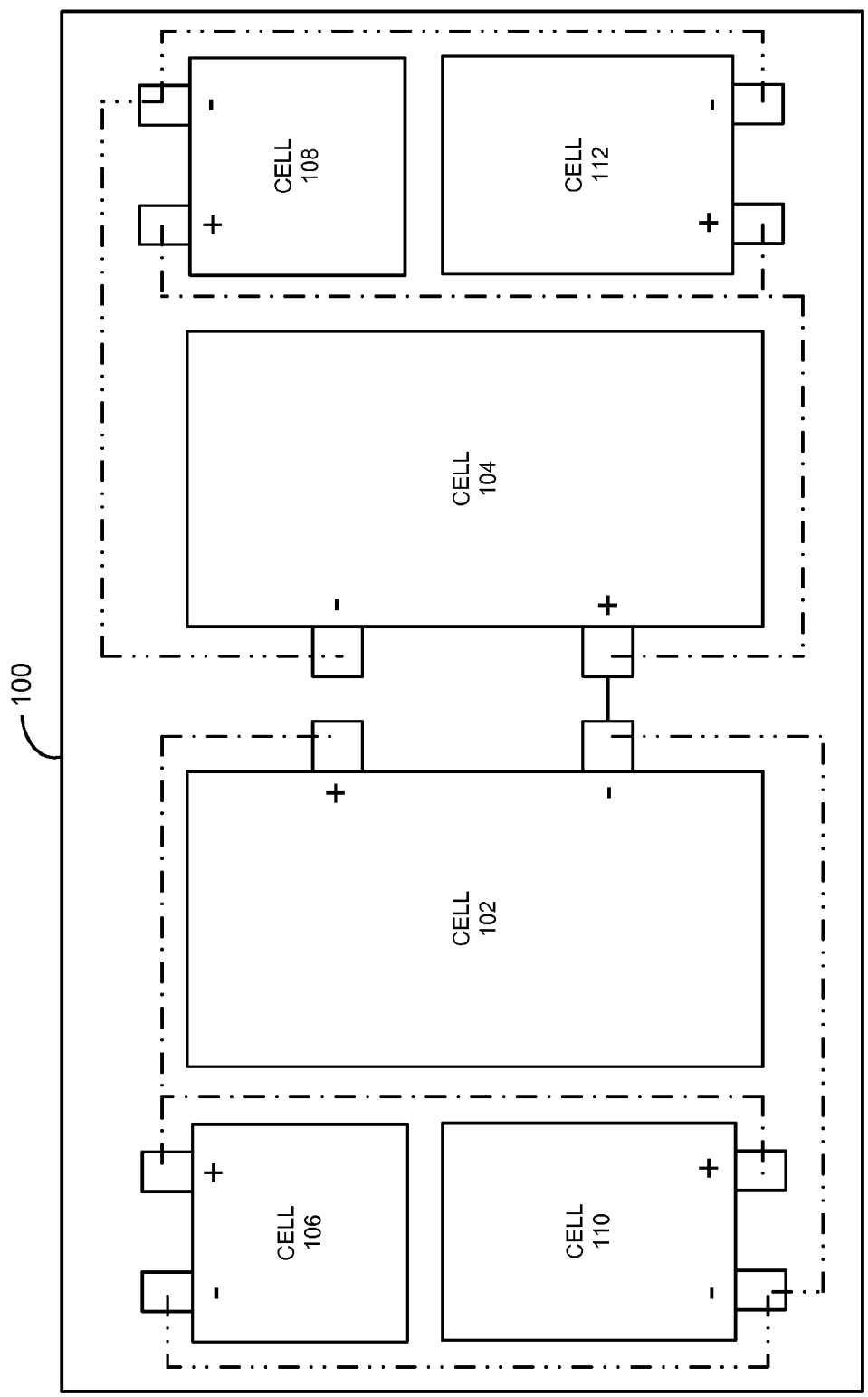
FIG. 1 shows a battery pack in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Embodiments provide a battery pack with multiple cells of different capacities, thicknesses, and/or dimensions. The cells may also be arranged to facilitate efficient use of space in a portable electronic device. For example, the cells may be stacked, placed side-by-side, and/or placed top-to-bottom to accommodate components in a mobile phone, laptop computer, and/or tablet computer.

In addition, the cells may be electrically coupled in a series and/or parallel configuration. In particular, the battery pack may include a first set of cells with different capacities electrically coupled in a parallel configuration. The battery pack may also include a second set of cells with different capacities electrically coupled in a parallel configuration. The first and second sets of cells may then be electrically coupled in a series configuration if the first and second sets of cells have substantially the same capacity.

FIG. 1 shows a battery pack 100 in accordance with an embodiment. Battery pack 100 may supply power to a portable electronic device such as a laptop computer, mobile phone, tablet computer, personal digital assistant (PDA), portable media player, digital camera, and/or other type of battery-powered electronic device.

As shown in FIG. 1, battery pack 100 includes a number of cells 102-112. Cells 102-112 may correspond to rechargeable (e.g., secondary) cells such as nickel-cadmium (Ni—Cd) cells, nickel-metal-hydride (Ni—MH) cells, lithium-ion cells, and/or lithium-polymer cells. For example, one or more cells 102-112 may correspond to lithium-polymer cells, each of which includes a jelly roll of layers wound together (e.g., a cathode with an active coating, a separator, and an anode with an active coating), and a flexible pouch enclosing the jelly roll. Lithium-polymer cells are discussed in further detail below with respect to FIG. 3.

In one or more embodiments, cells 102-112 have different capacities, thicknesses, and/or dimensions. For example, cells 102-104 may each have a capacity of 3.2 Ah, cells 106-108 may each have a capacity of 1.5 Ah, and cells 110-112 may each have a capacity of 1.7 Ah. Similarly, cells 102-104 may be longer, thicker, and/or wider than cells 106-112, and cells 106-108 may be longer, thicker, and/or wider than cells 110-112.

Cells 102-112 may also be electrically coupled in a series and/or parallel configuration. In particular, a first set of cells 102, 106, and 110 with different capacities may be electrically coupled in a parallel configuration, and a second set of cells 104, 108, and 112 with different capacities may also be electrically coupled in a parallel configuration. Because the first set of cells and the second set of cells have substantially the same overall capacity, the first and second sets of cells may be electrically coupled in a series configuration. In other words, cells 102-112 may be electrically coupled in a two in series, three in parallel (2s3p) configuration.

More specifically, the selection, electrical configuration, and/or arrangement of cells 102-112 may be based on the physical and/or electrical requirements of the portable electronic device. First, cells 102-112 may be selected for use in battery pack 100 and/or electrically coupled within battery pack 100 to meet the electrical (e.g., voltage, capacity, etc.) demands of components (e.g., printed circuit boards (PCBs), processors, memory, storage, display, optical drives, etc.) in the portable electronic device. For example, cell 106 may be electrically coupled in parallel to cell 110, and cell 108 may be electrically coupled in parallel to cell 112 to give the electrically coupled cells 106 and 110 and cells 108 and 112 the same capacity as cell 102 and cell 104 (e.g., 3.2 Ah). Cell 102, cell 104, cells 106 and 110, and cells 108 and 112 may then be electrically coupled in series to increase the voltage of battery pack 100.

Along the same lines, cells 102-112 may be selected for use in battery pack 100 and/or arranged within battery pack 100 to facilitate efficient use of space in the portable electronic device. For example, cells 102-112 may be selected for use in battery pack 110 and stacked, placed side-by-side, and/or placed top-to-bottom within battery pack 110 to accommodate components in a mobile phone, laptop computer, and/or tablet computer. Battery pack 100 may thus include an asymmetric design that maximizes the use of free space within the portable electronic device. In turn, battery pack 100 may provide greater capacity, packaging efficiency, and/or voltage than battery packs containing cells with the same capacity, dimensions, and/or thickness. Battery packs containing cells of varying sizes and/or dimensions are discussed in further detail below with respect to FIGS. 2-3.

Figure 2:
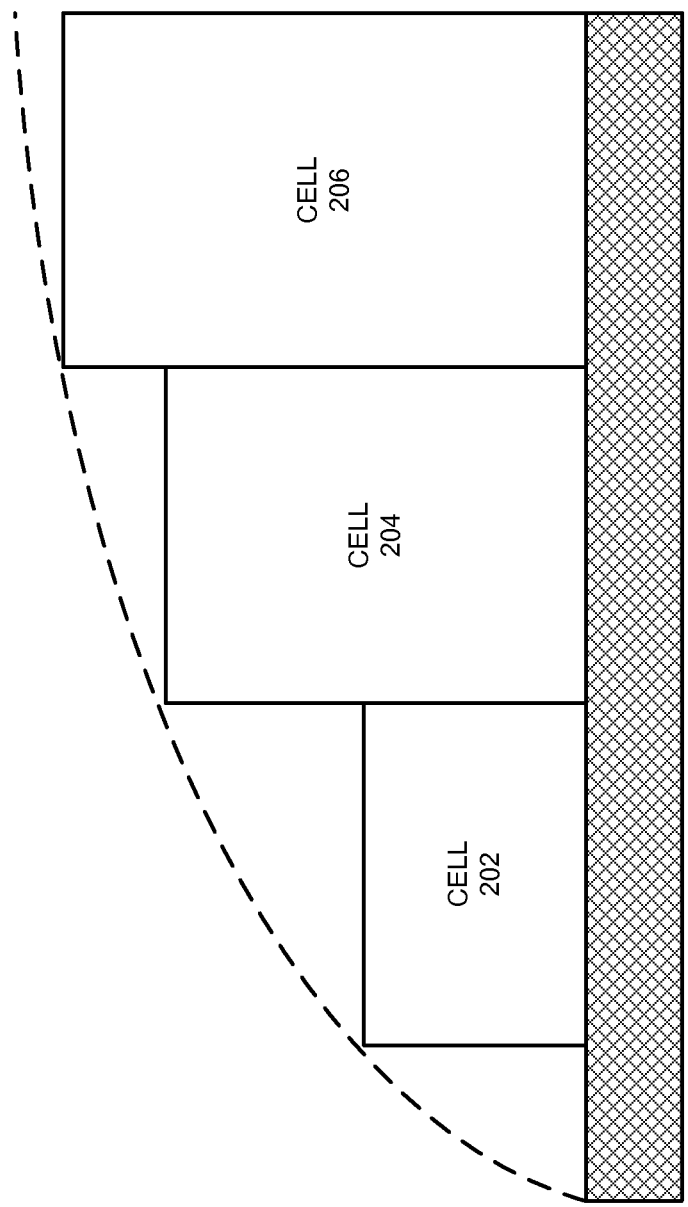
FIG. 2 shows a cross-sectional view of a battery pack in accordance with an embodiment.

FIG. 2 shows a cross-sectional view of a battery pack in accordance with an embodiment. The battery pack includes three cells 202-206 of different thicknesses and/or sizes. As shown in FIG. 2, cell 202 is the thinnest, cell 204 is of medium thickness, and cell 206 is the thickest. In addition, cells 202-206 may be arranged in the battery pack based on an asymmetric design that allows the battery pack to fill up the free space within a portable electronic device. For example, cells 202-206 may be positioned within the battery pack to take up a curved region of space inside a mobile phone, laptop computer, portable media player, digital camera, and/or PDA.

Figure 3:
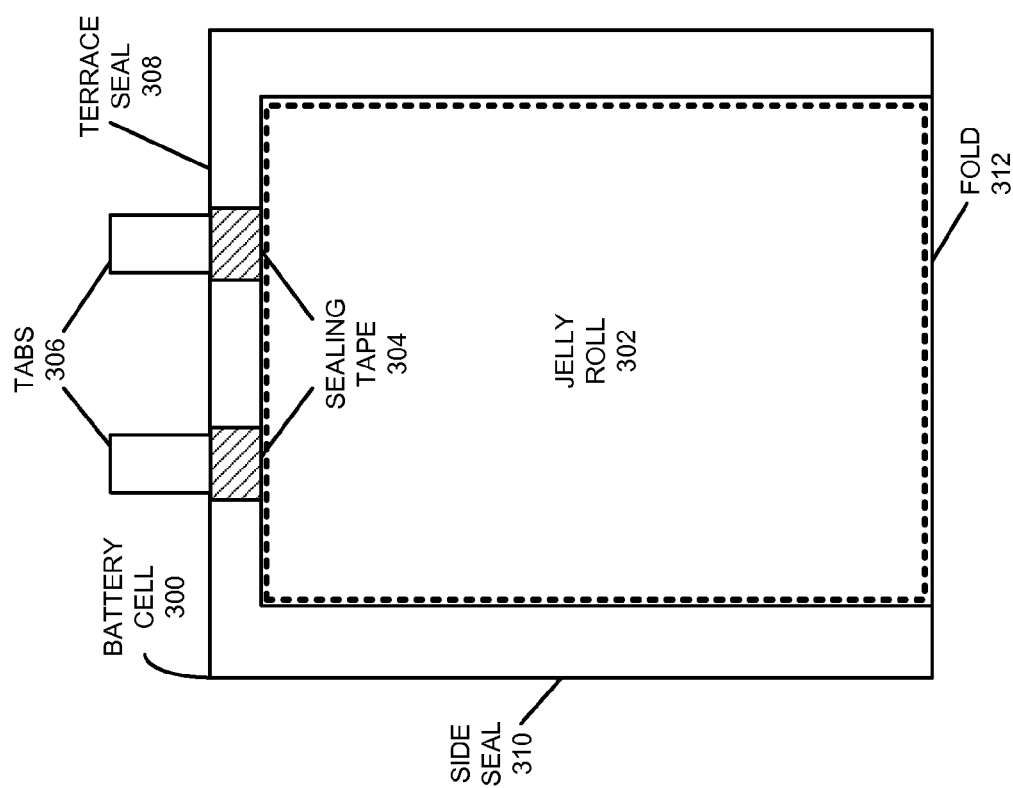
FIG. 3 shows a battery cell in accordance with an embodiment.

FIG. 3 shows a battery cell 300 in accordance with an embodiment. Battery cell 300 may correspond to a lithium-polymer cell that is used to power a portable electronic device. Battery cell 300 includes a jelly roll 302 containing a number of layers which are wound together, including a cathode with an active coating, a separator, and an anode with an active coating. More specifically, jelly roll 302 may include one strip of cathode material (e.g., aluminum foil coated with a lithium compound) and one strip of anode material (e.g., copper foil coated with carbon) separated by one strip of separator material (e.g., conducting polymer electrolyte). The cathode, anode, and separator layers may then be wound on a mandrel to form a spirally wound structure. Jelly rolls are well known in the art and will not be described further.

During assembly of battery cell 300, jelly roll 302 is enclosed in a flexible pouch, which is formed by folding a flexible sheet along a fold line 312. For example, the flexible sheet may be made of aluminum with a polymer film, such as polypropylene. After the flexible sheet is folded, the flexible sheet can be sealed, for example by applying heat along a side seal 310 and along a terrace seal 308.

Jelly roll 302 also includes a set of conductive tabs 306 coupled to the cathode and the anode. Conductive tabs 306 may extend through seals in the pouch (for example, formed using sealing tape 304) to provide terminals for battery cell 300. Conductive tabs 306 may then be used to electrically couple battery cell 300 with one or more other battery cells to form a battery pack, such as battery pack 100 of FIG. 1.

For example, battery cell 300 may belong to a first set of cells in the battery pack with different capacities electrically coupled in a parallel configuration. The battery pack may also include a second set of cells with different capacities coupled in a parallel configuration. The first set of cells may then be electrically coupled to the second set of cells in a series configuration if the first and second sets of cells have substantially the same capacity. Consequently, conductive tabs 306 may allow battery cell 300 to be used in a battery pack containing cells of different capacities that are electrically coupled in a parallel and/or a series-and-parallel configuration.

Figure 4:
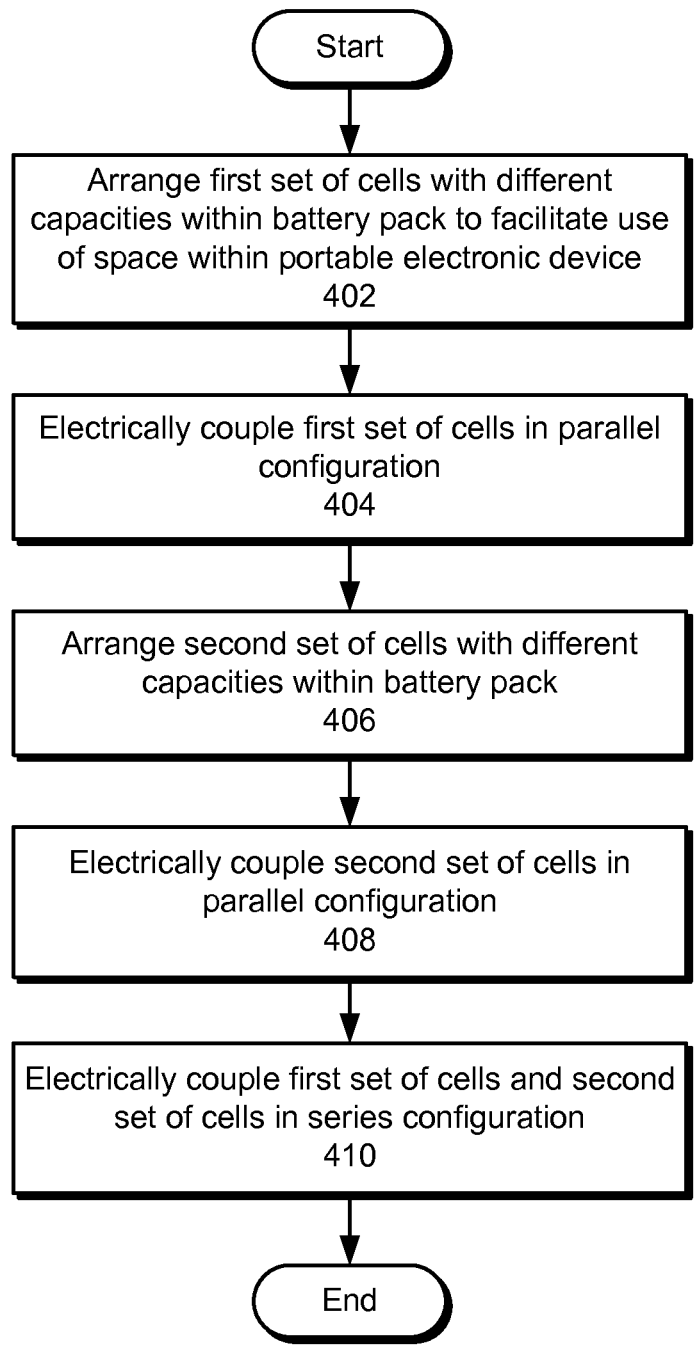
FIG. 4 shows a flowchart illustrating the process of providing a power source in accordance with an embodiment.

FIG. 4 shows a flowchart illustrating the process of providing a power source in accordance with an embodiment. In one or more embodiments, one or more of the steps may be omitted, repeated, and/or performed in a different order. Accordingly, the specific arrangement of steps shown in FIG. 4 should not be construed as limiting the scope of the embodiments.

Initially, a first set of cells with different capacities is arranged within a battery pack to facilitate use of space within a portable electronic device (operation 402). The cells may be selected for physical (e.g., dimension, thickness, etc.) and/or electrical (e.g., capacity, voltage, etc.) characteristics that allow the cells to adequately supply power to and/or accommodate components in the portable electronic device. The cells may correspond to lithium-polymer cells and/or other types of rechargeable battery cells. Next, the first set of cells is electrically coupled in a parallel configuration (operation 404). The parallel configuration may increase both the capacity and redundancy of the battery pack.

A second set of cells with different capacities is also arranged within the battery pack (operation 406) and electrically coupled in a parallel configuration (operation 408). As with the first set of cells, the second set of cells may be selected, electrically coupled, and/or arranged within the battery pack to meet the electrical and physical requirements of components in the portable electronic device.

Finally, the first set of cells is connected to the second set of cells in a series configuration (operation 410). The series connection of the two sets of cells may increase the voltage of the battery pack. Moreover, the first and second sets of cells may be electrically coupled in series if the first and second sets of cells have substantially the same capacity.

Figure 5:
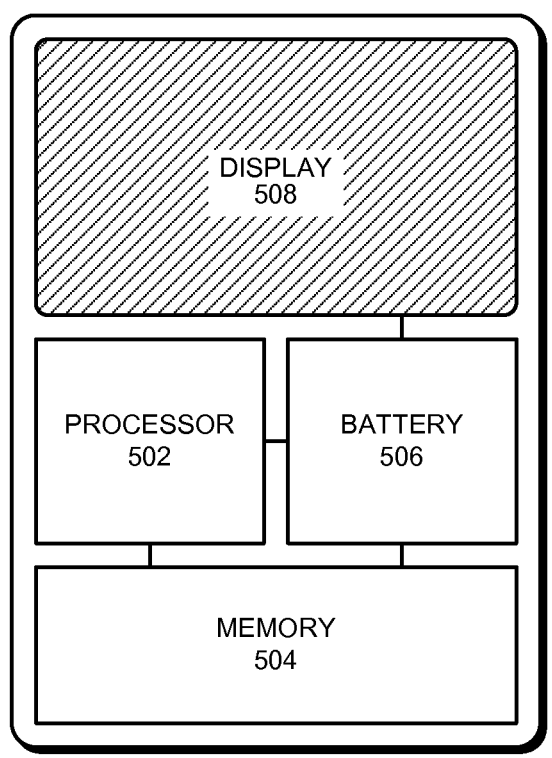
FIG. 5 shows a portable electronic device in accordance with an embodiment.

The above-described rechargeable battery pack can generally be used in any type of electronic device. For example, FIG. 5 illustrates a portable electronic device 500 which includes a processor 502, a memory 504 and a display 508, which are all powered by a battery 506. Portable electronic device 500 may correspond to a laptop computer, tablet computer, mobile phone, PDA, portable media player, digital camera, and/or other type of battery-powered electronic device. Battery 506 may correspond to a battery pack that includes one or more rechargeable battery cells. In particular, the battery pack may include a first set of cells with different capacities electrically coupled in a parallel configuration. The battery pack may also include a second set of cells with different capacities electrically coupled in a parallel configuration. The first and second sets of cells may be electrically coupled in a series configuration if the first and second sets of cells have substantially the same capacity.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. An electronic device, comprising:
one or more electronic components;
a first set of battery cells enclosed in flexible pouches, having different capacities and dimensions, and electrically coupled in a parallel configuration; and
a second set of battery cells enclosed in flexible pouches, having different capacities and dimensions, and electrically coupled in a parallel configuration, the second set of battery cells having substantially the same capacity as the first set of battery cells and being electrically coupled in series with the first set of battery cells;
wherein the first and second sets of battery cells are arranged to accommodate the electronic components and maximize the use of free space within the electronic device.

2. The electronic device of claim 1, wherein the first set of battery cells is stacked.

3. The electronic device of claim 1, wherein battery cells within the first set of battery cells have different thicknesses.

4. The electronic device of claim 1, wherein one or more of the battery cells are lithium-polymer battery cells.

5. The electronic device of claim 1, wherein the first set battery cells are placed within a concave region of a case of the electronic device.

6. The electronic device of claim 1, wherein the first set of battery cells comprises at least three cells arranged in increasing thickness.

7. The electronic device of claim 1, wherein the electronic device is a laptop computer, a mobile phone or a tablet computer.

8. The electronic device of claim 1, wherein a battery cell of the first set of battery cells has a shape and dimensions the same as a battery cell of the second set of battery cells.

9. The electronic device of claim 1, wherein the electronic device is a personal digital assistant, a portable media player, or a digital camera.

10. A method of providing a power source for an electronic device, the method comprising arranging first and second sets of battery cells within the electronic device to accommodate one or more electronic components and maximize use of free space within the electronic device, wherein:
the first and second sets of battery cells comprise battery cells enclosed in flexible pouches, having different dimensions and capacities, that are electrically coupled in parallel; and
the first and second sets of battery cells have substantially the same capacity and are electrically coupled in series.

11. The method of claim 10, wherein the first set of battery cells is stacked.

12. The method of claim 10, wherein battery cells within the first set of battery cells have different thicknesses.

13. The method of claim 10, wherein one or more of the battery cells are lithium-polymer battery cells.

14. The method of claim 10, wherein arranging first and second sets of battery cells within the electronic device to accommodate one or more electronic components and maximize use of free space within the electronic device comprises placing at least one cell within a curved region of a case of the electronic device.

15. The method of claim 10, wherein the first set of battery cells comprises at least three cells arranged in increasing thickness.

16. The method of claim 10, wherein the electronic device is a laptop computer, a mobile phone or a tablet computer.

17. A battery pack, comprising:
   a first set of battery cells enclosed in flexible pouches, having different capacities and dimensions, and electrically coupled in a parallel configuration; and
   a second set of battery cells enclosed in flexible pouches, having different capacities and dimensions, and electrically coupled in a parallel configuration, the second set of battery cells having substantially the same capacity as the first set of battery cells and being electrically coupled in series with the first set of battery cells;
   wherein the first and second sets of battery cells are arranged within the battery pack so that the battery pack fits within a case of an electronic device in a way that accommodates one or more components of the electronic device and maximizes the use of free space within the electronic device.

18. The battery pack of claim 17, wherein the first set of battery cells is stacked.

19. The battery pack of claim 17 wherein the first set of battery cells is arranged side-by-side.

20. The battery pack of claim 17, wherein battery cells within the first set of battery cells have different thicknesses.

21. The battery pack of claim 17, wherein one or more of the battery cells are lithium-polymer battery cells.

22. The battery pack of claim 17, wherein the battery pack fits within a case of an electronic device in a way that accommodates one or more components of the electronic device and maximizes the use of free space within the electronic device by disposing one or more cells within a concave region of a case of the electronic device.

23. The battery pack of claim 17, wherein the first set of battery cells comprises at least three cells arranged in increasing thickness.

* * * * *